Figure 1:
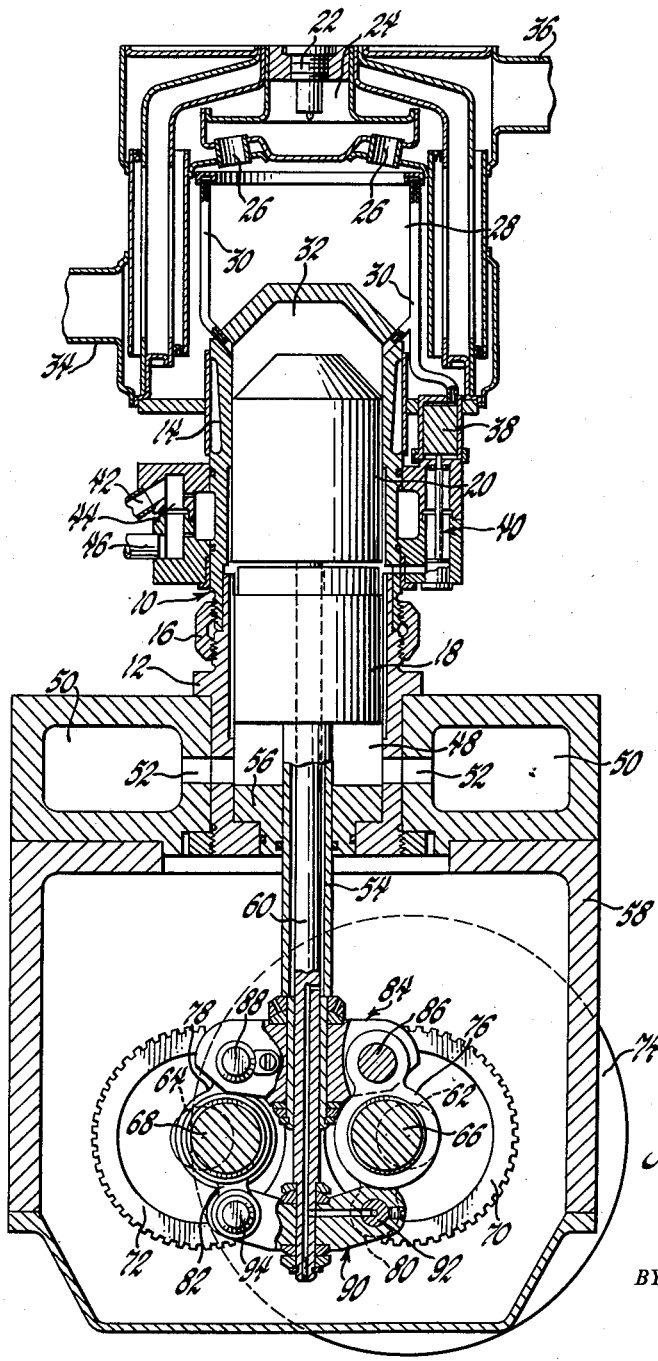

Feb. 19, 1963  H. F. REINHART ETAL  3,077,732
AIR ENGINE IMPROVEMENT
Filed Dec. 12, 1960

INVENTORS
Henry F. Reinhart &
BY Warren H. Smith

E. W. Christen
ATTORNEY 3,077,732
Patented Feb. 19, 1963

3,077,732
AIR ENGINE IMPROVEMENT
Henry F. Reinhart, Utica, and Warren H. Smith, Birmingham, Mich., assignors to General Motors Corporation, Detroit, Mich., a corporation of Delaware
Filed Dec. 12, 1960, Ser. No. 75,144
5 Claims. (Cl. 60—24)

This invention relates to a hot gas apparatus, such as a Stirling cycle engine, and more particularly to an improved form of drive means therefor.

The Stirling cycle engine is a typical form of hot gas apparatus which is generally provided with a cylinder having a power piston and a displacer reciprocably mounted therein. Usually, two crankshafts are mounted in the engine which rotate in opposite directions and divide the operating torque therebetween. The power piston and the displacer are secured to the twin crankshafts by means of coaxial piston rods and a symmetrical linkage system which divides the torque as above mentioned. The linkage is such that the action is all substantially in a single plane and with the symmetrical design, opposite forces will balance themselves out.

The usual drive means provides a method for balancing the forces exerted. It is simplified over the early drive systems, and is small enough to be contained in a closed space. This provides numerous advantages, insofar as size of the engine is concerned and in regard to the heat retaining properties of the apparatus.

There are several disadvantages in the present hot gas engine drive constructions. The presently known devices are precision manufactured in order to exactly balance forces and the like. However, these constructions cannot take up manufacturing tolerances and clearances in various parts of the engine nor do they provide for thermal expansion of the various parts. The stack-up of clearances and tolerances and the thermal expansion results in side thrust forces on various parts of the engine. These forces are not balanced, causing an increase in friction due to the bending and binding of the parts. An increase in friction obviously causes a decrease in efficiency of the engine, destroying the advantages of the high theoretical efficiency in this type of engine. For best operation, it is desirable to operate at maximum possible efficiency.

The device in which this invention is embodied comprises, generally, a plurality of connecting rods and yoke members disposed between the coaxial rods and the twin crankshafts, with the yoke members universally connected to the appropriate piston rods. The universal connections take the form of ball and socket joints and serve to eliminate the side thrust caused by the stack-up of clearances and tolerances as well as thermal expansion and equalize the forces transferred between the piston and displacer and the crankshafts.

By eliminating the side thrust forces, the engine friction caused thereby is reduced and the overall efficiency of the engine is allowed to more closely approach its theoretical value.

Figure 2:
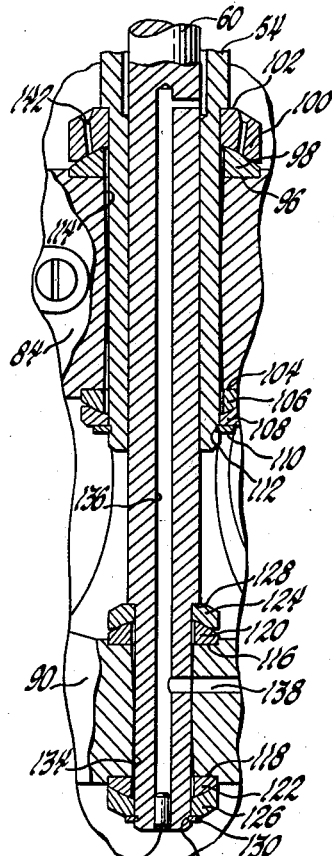

These and other advantages will become more apparent from the following description and drawings, in which:

FIGURE 1 is a cross-sectional view of a typical hot gas apparatus with the drive means therein, illustrating the position of the various parts; and FIGURE 2 is an enlarged cross-sectional view of a portion of the drive means illustrated in FIGURE 1, showing the universal connections between the yoke members and the appropriate rods.

Referring more particularly to the drawings, FIGURE 1 best illustrates the typical hot gas apparatus in the form of a Stirling cycle engine. The engine is provided with a cylinder 10 which may be formed in any suitable fashion and, for illustrative purposes, is shown to include a lower portion 12 and an upper portion 14 secured together by a threaded ring 16. A power piston 18 is received in the cylinder 10 beneath a displacer 20, as is the usual construction. A burner nozzle 22 extends into a pre-oxidation chamber 24 which is connected by means of swirl passages 26 to the burner combustion chamber 28. Suitable heater tubes 30 in the combustion chamber 28 communicate with the expansion chamber 32 in the cylinder 10 and above the displacer 20. An air inlet 34 provides air to the combustion chamber and an exhaust outlet 36 conveys the air and products of combustion from the engine. A suitable regenerator 38 and cooler 40 are disposed adjacent the cylinder 10 for passage of the operating fluid from one end of the cylinder 10 to the other in the usual manner. A water inlet passage 42 conveys coolant to an annular chamber 44 communicating with the cooler 40 and a water outlet 46 conveys the fluid from the engine. A buffer space 48 is provided in cylinder 10 beneath the piston 18 and in communication with an annular chamber 50 through suitable passages 52. The above construction is all well known and is the usual manner of constructing and operating a typical Stirling cycle engine.

Piston 18 is provided with a hollow piston rod 54 which is secured to the underside of the piston 18 in any suitable manner and extends axially therefrom through a closure member 56 and into the crankcase 58 mounted below the cylinder 10. Piston 18 is provided with an axial bore to permit the passage of a displacer piston rod 60 which extends axially from the lower surface of the displacer 20 through the piston 18 and through the hollow piston rod 54 into the crankcase 58. It is to be noted that as far as described, the operating structure is all symmetrical and coaxial about the central axis of the cylinder.

In order to take the operating torque from the hot gas apparatus a pair of crankshafts 62 and 64 are located in crankcase 58 and on opposite sides of the central axis of the cylinder 10. Crankshafts 62 and 64 are provided with crank arms 66 and 68, respectively, to permit driving in a manner conventional to crankshafts. A pair of gears 70 and 72 may be mounted on the crankshafts 62 and 64, the gears 70 and 72 being of the same size and having the same number of teeth to separate the torque transmitted from the operating parts in equal portions. A flywheel 74 may be provided on the end of one of the crankshafts, as crankshaft 62, for the usual purposes.

Journaled on the cranks 66 and 68 of crankshafts 62 and 64 are a pair of piston connecting rods 76 and 78 which are disposed on opposite sides of the central axis of the cylinder 10 and thus on opposite sides of the piston rod 54. Piston connecting rods 76 and 78 are of the same length and shape and the cranks 66 and 68 are freely rotatable within the connecting rods 76 and 78. Also journaled on the cranks 66 and 68 are a pair of displacer connecting rods 80 and 82 which are equal in length and located on opposite sides of the central axis of the cylinder as well as the axis of the displacer rod 60. Connecting rods 80 and 82 are rotatable about the cranks 66 and 68, respectively.

A piston rod yoke member, illustrated generally by the numeral 84, is received on the piston rod 54, in a manner to be more fully described, and is connected to the piston connecting rods 76 and 78 by means of pivot pins 86 and 88. Similarly, a displacer rod yoke member, illustrated generally by the numeral 90, is mounted on the displacer rod in a manner to be more fully described and is secured to the ends of the displacer connecting rods 80 and 82 by means of pivot pins 92 and 94. The connecting rods and yoke members provide for driving of the crankshafts 62 and 64 as well as providing the proper motion for the displacer 20. The linkage is such that forces will be substantially balanced, and, when taken with the gears 70 and 72, will separate the torque between the crankshafts 62 and 64.

Referring more particularly to FIGURE 2, the manner in which the yoke members 84 and 90 are secured to the piston rod 54 and the displacer rod 60 is best illustrated. Piston rod yoke member 84 has an annular groove 96 formed in the upper surface thereof and about the piston rod 54 to receive a ball segment 98 having a generally spherical upper surface. A socket element 100 is received about the piston rod 54 and abuts a suitable shoulder 102 formed thereon. At the lower surface of the yoke member 84 a second annual groove 104 is provided to receive a second ball segment 106 disposed about the piston rod 54. A socket element 108 receives the ball segment 106 and is received about the piston rod 54. A retaining ring 110 received in a suitable groove 112 formed in the end of the piston rod 54 serves to properly locate the entire assembly and retain the assembly between the retaining ring 110 and the shoulder 102.

It is to be noted that the aperture 114 through the yoke member 84 is not cylindrical but is formed by a surface which may be generated by a line rotated about the central axis of the aperture, which is also the axis of the piston rod 54, the line being such that the ends thereof are more distant from the axis than is the intermediate portion. This form may be similar to an ellipsoid of revolution or a paraboloid of revolution, although is not to be restricted thereto. It is seen that in order to provide universal motion of the yoke member 84 about the piston rod 54, through the ball and socket connections, that a certain amount of clearance must be provided between the yoke member itself and the piston rod. This is provided by the above described surface of revolution forming the aperture 114.

Also in FIGURE 2, the displacer yoke member 90 is shown secured to the displacer rod 60. This connection is similar to that above described wherein opposite sides of the yoke member 90 are provided with annular grooves 116 and 118 to receive ball segments 120 and 122. Socket elements 124 and 126 are received about the displacer rod 60, element 124 being seated against a suitable shoulder 128, and element 126, as well as the remainder of the assembly, being secured and located by means of retaining ring 130 seated in a suitable groove 132 in the end of the displacer rod 60. Yoke member 90 is provided with a central aperture 134 which is also defined by a surface of revolution generated by a line rotated about the central axis of the aperture and having its ends more distant from the axis than its intermediate portion. This aperture 134 along with the ball and socket connections provide a limited amount of universal motion of the yoke member 90 about the displacer rod 60.

It may be desirable to lubricate the various portions of the driving linkage, which may be accomplished by means of lubricating passages 136 and 138 formed in the displacer rod 60 and the displacer yoke member 90, respectively. Passage 136 is closed at its lower end by means of a suitable plug 140 in a conventional manner. The ball and socket engaging surfaces may also be lubricated, as by passages 142 in socket block 100.

It may be seen that the ball and socket connections between the piston rod yoke member and the displacer rod yoke member allow take-up means for the various manufacturing tolerances and clearances that might stack up in the construction of the apparatus. Thermal expansion of the various parts due to the heat generated in the engine will also be taken up by the universal connections and that amount of friction due to these tolerances and expansions will be eliminated. By eliminating the bending and binding friction the efficiency of the apparatus will more closely approach the theoretical efficiency which will provide a better device.

What is claimed is:

1. In a reciprocating apparatus of the type comprising a cylinder and a crankcase, a displacer in said cylinder, a piston in said cylinder and having an axial bore formed therethrough, a hollow piston rod extending axially of said piston and into said crankcase, a rod extending from said displacer and through said bore in said piston and through said hollow piston rod and into said crankcase, a pair of crankshafts mounted in said crankcase and rotatable in opposite directions and located on opposite sides of said piston rod and said displacer rod, a pair of piston connecting rods and a pair of displacer connecting rods mounted on said crankshafts, one of said piston connecting rods and one of said displacer connecting rods being mounted on one of said crankshafts and the other of said piston connecting rods and the other of said displacer connecting rods being mounted on the other of said crankshafts, a piston rod yoke member received on said piston rod and secured to each of said piston connecting rods, and a displacer rod yoke member received on said displacer rod and secured to each of said displacer connecting rods, said yoke members and said connecting rods driving said crankshafts, the improvement comprising ball and socket connections between said piston rod and piston rod yoke member and said displacer rod and displacer rod yoke member to permit limited universal motion therebetween and eliminate side thrust on said piston rod and said displacer rod.

2. In a reciprocating apparatus of the type comprising a cylinder and a crankcase, a displacer in said cylinder, a piston in said cylinder and having an axial bore formed therethrough, a hollow piston rod extending axially of said piston and into said crankcase, a rod extending from said displacer and through said bore in said piston and through said hollow piston rod and into said crankcase, a pair of crankshafts mounted in said crankcase and rotatable in opposite directions and located on opposite sides of said piston rod and said displacer rod, a pair of piston connecting rods and a pair of displacer connecting rods mounted on said crankshafts, one of said piston connecting rods and one of said displacer connecting rods being mounted on one of said crankshafts and the other of said piston connecting rods and the other of said displacer connecting rods being mounted on the other of said crankshafts, a piston rod yoke member rotatably secured to each of said piston connecting rods, and a displacer rod yoke member rotatably secured to said displacer rod and secured to each of said displacer connecting rods, the improvement comprising universal joint means connecting said yoke members with said piston and displacer rods for driving said crankshafts and eliminating side thrust forces on said piston rod and said displacer rod.

3. In a reciprocating apparatus of the type comprising a cylinder and a crankcase, a displacer in said cylinder, a piston in said cylinder and having an axial bore formed therethrough, a hollow piston rod extending axially of said piston and into said crankcase, a rod extending from said displacer and through said bore in said piston and through said hollow piston rod and into said crankcase, a pair of crankshafts mounted in said crankcase and rotatable in opposite directions and located on opposite sides of said piston rod and said displacer rod, a pair of piston connecting rods and a pair of displacer connecting rods mounted on said crankshafts, one of said piston connecting rods and one of said displacer connecting rods being mounted on one of said crankshafts and the other of said piston connecting rods and the other of said displacer connecting rods being mounted on the other of said crankshafts, the improvement comprising a piston rod yoke member having an aperture therethrough and received on said piston rod, said aperture having a surface generated by a line rotated about the axis of said aperture and said line having the ends thereof spaced from said axis a distance greater than the intermediate portion thereof, said piston rod yoke member being secured to each of said piston connecting rods, a displacer rod yoke member having an aperture therethrough and received on said displacer rod, said aperture having a surface generated by a line rotated about the axis of aperture and said line having the ends thereof spaced from said axis a distance greater than the intermediate portion thereof, said yoke member being secured to each of said displacer connecting rods, a pair of ball segments mounted on opposite sides of said piston rod yoke member and about said piston rod, a pair of socket elements mounted on said piston rod and engaging said ball segments, a pair of ball segments mounted on opposite sides of said displacer rod yoke member, a pair of socket elements mounted on said displacer rod and engaging said ball segments, said surfaces on said apertures and said ball segments and said socket elements permitting limiting universal movement of said yoke members to eliminate side thrust forces on said piston rod and said displacer rod.

4. In a reciprocating apparatus of the type comprising a cylinder and a crankcase, a displacer in said cylinder, a piston in said cylinder and having an axial bore formed therethrough, a hollow piston rod extending axially of said piston and into said crankcase, a rod extending from said displacer and through said bore in said piston and through said hollow piston rod and into said crankcase, a pair of crankshafts mounted in said crankcase and rotatable in opposite directions and located on opposite sides of said piston rod and said displacer rod, a pair of piston connecting rods and a pair of displacer connecting rods mounted on said crankshafts, one of said piston connecting rods and one of said displacer connecting rods being mounted on one of said crankshafts and the other of said piston connecting rods and the other of said displacer connecting rods being mounted on the other of said crankshafts, the improvement comprising a piston rod yoke member having an aperture therethrough and received on said piston rod, said aperture having a surface generated by a line rotated about the axis of said aperture and said line having the ends thereof spaced from said axis a distance greater than the intermediate portion thereof, said piston rod yoke member being secured to each of said piston connecting rods, a displacer rod yoke member received on said displacer rod and secured to each of said displacer connecting rods, a pair of ball segments mounted on said piston rod yoke member, a pair of socket elements secured to said piston rod and engaging said ball segments, said surface of said aperture and said ball segments and said socket elements permitting limited universal motion of said piston rod yoke member about said piston rod to eliminate side thrust forces on said piston rod.

5. In a reciprocating apparatus of the type having a cylinder and a crankcase and a piston and displacer in said cylinder and a piston rod extending into said crankcase and a displacer rod extending through said piston and through said piston rod and into said crankcase and a pair of crankshafts in said crankcase and on opposite sides of said piston rod and said displacer rod, means for driving said crankshafts and comprising a pair of piston connecting rods journaled on said crankshafts, a pair of displacer connecting rods journaled on said crankshafts, one of said piston connecting rods and one of said displacer connecting rods being journaled on one of said crankshafts and on one side of said piston rod, the other of said piston connecting rods and the other of said displacer connecting rods being journaled on the other of said crankshafts and on the other side of said piston rod, the improvement comprising a piston yoke member universally mounted on said piston rod and secured to each of said piston connecting rods, and a displacer yoke member universally connected to said displacer connecting rods, said yoke members and said connecting rods driving said crankshafts, said yoke members eliminating side thrust on said piston rod and said displacer rod to decrease friction in said apparatus.

References Cited in the file of this patent

UNITED STATES PATENTS

| | | |
|---|---|---|
| 200,306 | Irick | Feb. 12, 1878 |
| 2,775,899 | Vagneur | Jan. 1, 1957 |
| 2,787,163 | Bates | Apr. 2, 1957 |
| 2,885,855 | Meyer | May 12, 1959 |
| 2,951,334 | Meijer | Sept. 6, 1960 |